Figure 1:
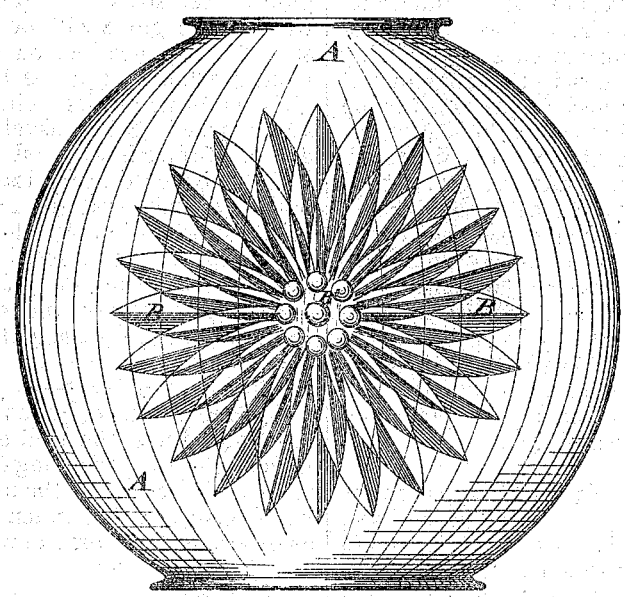

GEORGE M. IRWIN.

Improvement in Glass Globes for Lamps.

No. 120,747.  Patented Nov. 7, 1871.

Witnesses:

Inventor:
Geo. M. Irwin
By James J. Johnston
his attorney

UNITED STATES PATENT OFFICE.

GEORGE M. IRWIN, OF BIRMINGHAM, PENNSYLVANIA.

IMPROVEMENT IN GLASS GLOBES FOR LAMPS.

Specification forming part of Letters Patent No. 120,747, dated November 7, 1871.

*To all whom it may concern:*

Be it known that I, GEORGE M. IRWIN, of Birmingham, in the county of Allegheny and State of Pennsylvania, have invented a new and useful article of manufacture, viz., a Glass Globe for Lamps; and I do hereby declare that the following is a full, clear, and exact description thereof, reference being had to the accompanying drawing and to the letters of reference marked thereon.

The nature of my invention consists in providing a new article of manufacture, viz., a glass globe for lamps, a portion of said globe being furnished with a series of lozenge-shaped projections on its inner wall and corresponding indentations in the outer wall, which indentations are silvered over for the purpose of forming a reflector, whereby the light of the lamp is radiated from a large number of points and commingled so as to give an increased and mellow light.

To enable others to make my new article of manufacture, I will proceed to describe more fully its construction.

In the accompanying drawing, which forms part of my specification, A is the glass globe, which is formed in a mold so constructed as to form the indentations in the outer wall and corresponding projections on the inner wall, as shown at B B B'. The mold in which the globe is formed will have on its inner wall or surface a series of projections, which, in form and size, will correspond to the form and depth of the indentations desired in the outer wall of the glass globe. The size of the projections on the inner wall of the globe will be in proportion to the size of the projections on the inner wall of the mold in which the globe is formed. After the globe is formed in its mold it is removed from it and finished in the usual manner, and the indented surface is silvered over and then coated with sizing or other suitable material so as to protect the silvered surface. The indentations in the outer wall of the globe will, in a great degree, protect the silvered surfaces from being rubbed off or being injured.

I wish it clearly understood that I do not claim, broadly, a glass globe provided with a reflector; but What I do claim is—

A new article of manufacture, viz., a glass globe for lamps, the said globe being provided with a reflector consisting of a series of lozenge-shaped projections on the inner wall of the globe, with corresponding indentations silvered over, as described, and for the purpose set forth.

GEO. M. IRWIN.

Witnesses:
FRANCIS L. CLARK,
A. W. HARRISON. (90)